(12) United States Patent
Crothers et al.

(10) Patent No.: US 9,745,896 B2
(45) Date of Patent: Aug. 29, 2017

(54) SYSTEMS AND METHODS TO CONTROL COMBUSTION DYNAMIC FREQUENCIES BASED ON A COMPRESSOR DISCHARGE TEMPERATURE

(71) Applicant: General Electric Company, Schenectady, NY (US)

(72) Inventors: Sarah Lori Crothers, Greenville, SC (US); Matthew Durham Collier, Simpsonville, SC (US); Scott Edward Sherman, Boulder, CO (US); Joseph Vincent Citeno, Greenville, SC (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 783 days.

(21) Appl. No.: 13/777,724

(22) Filed: Feb. 26, 2013

(65) Prior Publication Data

US 2014/0238033 A1    Aug. 28, 2014

(51) Int. Cl.
*F02C 7/24*    (2006.01)
*F01D 25/06*    (2006.01)
(Continued)

(52) U.S. Cl.
CPC .............. *F02C 7/24* (2013.01); *F01D 25/04* (2013.01); *F01D 25/06* (2013.01); *F02C 9/18* (2013.01); *F05D 2260/96* (2013.01); *F05D 2270/083* (2013.01); *F05D 2270/10* (2013.01); *F05D 2270/14* (2013.01); *F23R 2900/00013* (2013.01)

(58) Field of Classification Search
CPC .. F23R 2900/00005; F23R 2900/00013; F05D 2260/96; F05D 2260/961; F02C 7/24; F02C 9/18; F02C 9/20; F01D 25/04; F01D 25/06
See application file for complete search history.

(56) References Cited

U.S. PATENT DOCUMENTS 4,199,936 A * 4/1980 Cowan ..................... F01N 1/02
60/226.1
7,278,266 B2    10/2007 Taware et al.
(Continued)

FOREIGN PATENT DOCUMENTS

| EP | 1605205 A2 | 12/2005 |
| EP | 1632718 A2 | 3/2006 |
| EP | 2031192 A2 | 3/2009 |

OTHER PUBLICATIONS

Lieuwen, Timothy C. Yang, Vigor. (2005). Combustion Instabilities in Gas Turbine Engines—Operational Experience, Fundamental Mechanisms, and Modeling—Progress in Astronautics and Aeronautics, vol. 210. AIAA. pp. 65-88. Online version: http://app.knovel.com/hotlink/toc/id:kpCIGTEOE1/combustion-instabilities/combustion-instabilities.*

*Primary Examiner* — Pascal M Bui Pho
*Assistant Examiner* — Marc Amar
(74) *Attorney, Agent, or Firm* — Eversheds Sutherland (US) LLP

(57) ABSTRACT

Systems and methods for frequency separation in a gas turbine engine are provided herein. The systems and methods for frequency separation in a gas turbine engine may include determining a hot gas path natural frequency, determining a combustion dynamic frequency, and modifying a compressor discharge temperature to separate the combustion dynamic frequency from the hot gas path natural frequency.

18 Claims, 1 Drawing Sheet

(51) Int. Cl.
*F01D 25/04* (2006.01)
*F02C 9/18* (2006.01)

(56) References Cited

U.S. PATENT DOCUMENTS

| | | |
|---|---|---|
| 7,337,057 B2 | 2/2008 | Norman et al. |
| 7,451,601 B2 | 11/2008 | Taware et al. |
| 7,743,599 B2 | 6/2010 | Taware et al. |
| 7,805,922 B2 | 10/2010 | Bland |
| 7,908,072 B2 | 3/2011 | Tonno et al. |
| 7,997,083 B2 | 8/2011 | Meadows et al. |
| 2004/0011020 A1* | 1/2004 | Nomura ............ F01D 17/162 60/39.281 |
| 2005/0050901 A1* | 3/2005 | Little ............ F01D 5/08 60/785 |
| 2005/0150231 A1* | 7/2005 | Laster ............ F02C 9/18 60/777 |
| 2005/0254958 A1* | 11/2005 | Stone ............ F01D 5/02 416/248 |
| 2005/0278108 A1 | 12/2005 | Norman et al. |
| 2006/0042261 A1 | 3/2006 | Taware et al. |
| 2006/0254279 A1 | 11/2006 | Taware et al. |
| 2007/0062196 A1* | 3/2007 | Gleeson ............ F23N 5/242 60/722 |
| 2007/0180831 A1 | 8/2007 | Bland |
| 2008/0010966 A1 | 1/2008 | Taware et al. |
| 2008/0243352 A1* | 10/2008 | Healy ............ F01D 17/00 701/100 |
| 2009/0005951 A1 | 1/2009 | Frederick et al. |
| 2009/0005952 A1 | 1/2009 | Tonno et al. |
| 2009/0063003 A1 | 3/2009 | Meadows et al. |
| 2009/0155082 A1* | 6/2009 | Duong ............ F01D 5/005 416/223 A |
| 2011/0072826 A1* | 3/2011 | Narra ............ F02C 7/228 60/772 |
| 2011/0179877 A1* | 7/2011 | Hanoomanjee ............ B25B 5/08 73/662 |
| 2013/0131951 A1* | 5/2013 | Pandey ............ F02C 9/16 701/100 |

* cited by examiner

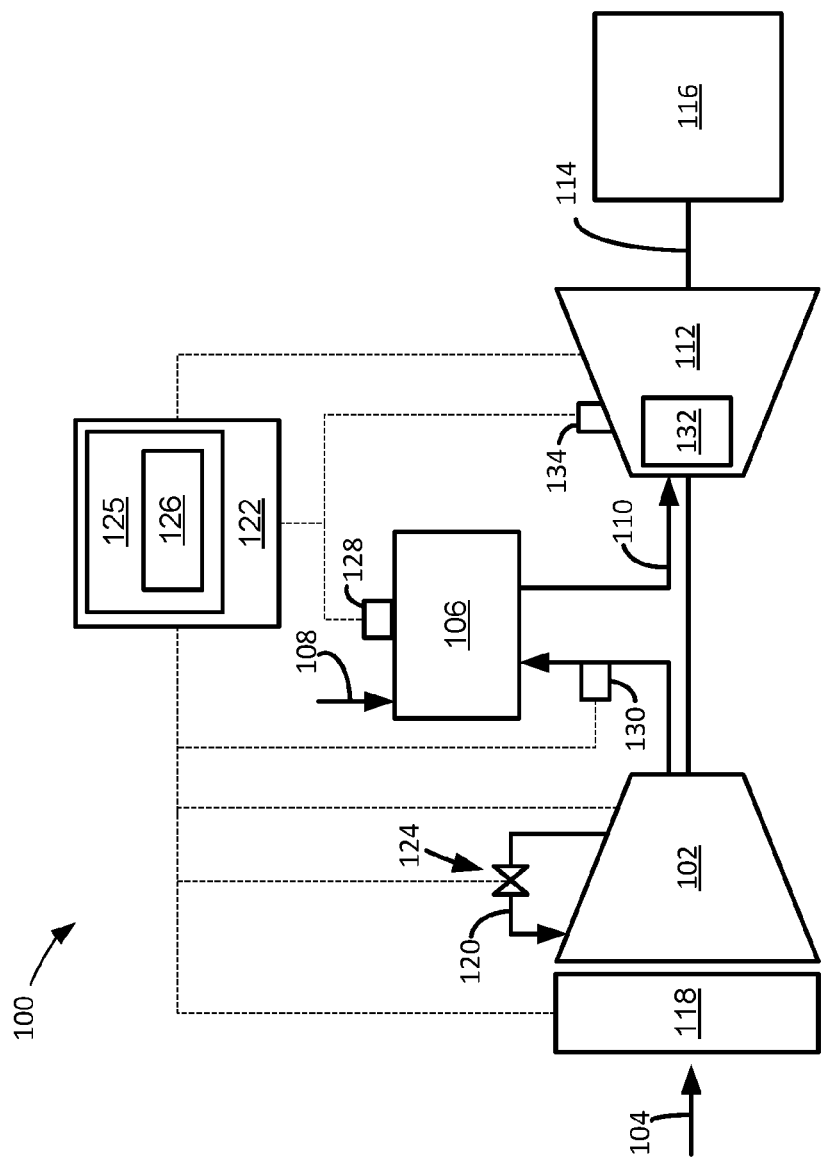

SYSTEMS AND METHODS TO CONTROL COMBUSTION DYNAMIC FREQUENCIES BASED ON A COMPRESSOR DISCHARGE TEMPERATURE

FIELD OF THE DISCLOSURE

Embodiments of the present disclosure relate generally to a gas turbine engines and more particularly to systems and methods to control combustion dynamic frequencies.

BACKGROUND OF THE DISCLOSURE

Combustors are commonly used in industrial and commercial operations to ignite fuel to produce combustion gases having a high temperature and pressure. For example, gas turbines and other turbomachines typically include one or more combustors to generate power or thrust. A typical gas turbine used to generate electrical power includes an axial compressor at the front, multiple combustors around the middle, and a turbine at the rear. Ambient air enters the compressor as a working fluid, and the compressor progressively imparts kinetic energy to the working fluid to produce a compressed working fluid at a highly energized state. The compressed working fluid exits the compressor and flows through one or more fuel injectors in the combustors where the compressed working fluid mixes with fuel before igniting to generate combustion gases having a high temperature and pressure. The combustion gases flow to the turbine where they expand to produce work. For example, expansion of the combustion gases in the turbine may rotate a shaft connected to a generator to produce electricity.

At particular operating conditions, combustion dynamics at specific frequencies and with sufficient amplitudes, which are in-phase and coherent, may produce undesirable sympathetic vibrations in the turbine and/or other downstream components. Typically, this problem is managed by combustor tuning. Combustor tuning to protect the turbine buckets, however, may impose severe restrictions on the function and operability of the combustor. Thus, there is a continued desire to improve the ability to separate the combustion dynamic frequencies and the turbine bucket natural frequencies.

BRIEF DESCRIPTION OF THE DISCLOSURE

Some or all of the above needs and/or problems may be addressed by certain embodiments of the present disclosure. According to an embodiment, there is disclosed a method for frequency separation in a gas turbine engine. The method may include determining a hot gas path component natural frequency. The method may also include determining a combustion dynamic frequency. Moreover, the method may include modifying a compressor discharge temperature to separate the combustion dynamic frequency from the hot gas path component natural frequency.

According to another embodiment, there is disclosed a system for frequency separation in a gas turbine engine. The system may include a compressor, a combustor in communication with the compressor, and a turbine in communication with the compressor and the combustor. The system may also include a controller in communication with at least one of the compressor, the combustor, or the turbine. The controller may be configured to modify a compressor discharge temperature to separate a combustion dynamic frequency from a hot gas path component natural frequency.

Further, according to another embodiment, there is disclosed a system for frequency separation. The system may include a gas turbine engine and a controller in communication with the gas turbine engine. The controller may include at least one memory that stores computer-executable instructions and at least one processor configured to access the at least one memory. The at least one processor may be configured to execute the computer-executable instructions to: determine a hot gas path component natural frequency; determine a combustion dynamic frequency; and modify a compressor discharge temperature to separate the combustion dynamic frequency from the hot gas path component natural frequency.

Other embodiments, aspects, and features of the disclosure will become apparent to those skilled in the art from the following detailed description, the accompanying drawings, and the appended claims.

BRIEF DESCRIPTION OF THE DRAWINGS

Reference will now be made to the accompanying drawing, which is not necessarily drawn to scale.

FIG. 1 is a schematic of an example diagram of a gas turbine engine system configured to control combustion dynamic frequencies, according to an embodiment.

DETAILED DESCRIPTION OF THE DISCLOSURE

Illustrative embodiments will now be described more fully hereinafter with reference to the accompanying drawing, in which some, but not all embodiments are shown. The present disclosure may be embodied in many different forms and should not be construed as limited to the embodiments set forth herein. Like numbers refer to like elements throughout.

Illustrative embodiments are directed to, among other things, systems and methods for frequency separation in a gas turbine engine. For example, in certain embodiments, a combustion dynamic frequency may be actively separated (or shifted) from a hot gas path component natural frequency by modifying a compressor discharge temperature. That is, the combustion dynamics frequencies associated with a combustor in a gas turbine engine may be modified by adjusting a compressor discharge temperature. In some instances, the compressor discharge temperature may be modified by adjusting one or more inlet guide vanes associated with a compressor. In other instances, the compressor discharge temperature may be modified by adjusting inlet bleed heat associated with a compressor. In yet other instances, the compressor discharge temperature may be modified by adjusting the temperature of the air entering the compressor section by evaporative cooling, heat exchangers, or other temperature-altering devices known in the art. Also, the compressor discharge temperature may be modified by a combination of adjusting one or more inlet guide vanes and/or adjusting inlet bleed heat and/or adjusting the temperature of the air entering the compressor.

The hot gas path component natural frequency may include a single frequency of interest or a range of frequencies of interest. In some instances, the hot gas path component may be a turbine bucket (such as, for example, a stage one turbine bucket) or other turbine component. The hot gas path component may include any turbine component at any stage in the turbine. Similarly, the combustion dynamic frequency may include a single frequency of interest or a range of frequencies of interest.

As noted above, the compressor discharge temperature can be adjusted by regulating an inlet guide vane angle and/or a flow of inlet bleed heat to a compressor and/or adjusting the temperature of the air entering the compressor. For example, in some embodiments, a controller may be configured to monitor a frequency and amplitude of a combustor tone in real time by way of one or more dynamic pressure sensors or the like. In this manner, active control can be implemented via the controller to regulate the frequency of interest of the combustor in real time, separating (or shifting) it from a hot gas path component natural frequency. The frequency of interest of the combustor can be modified in order to maintain frequency separation between the turbine buckets and the combustor, preventing unacceptable turbine bucket response due to frequency overlap.

In certain embodiments, the compressor discharge temperature may be adjusted to control combustion dynamics frequencies of interest to maintain separation from hot gas path component natural frequencies. The role of compressor discharge temperature in affecting the combustion dynamics frequencies is twofold. First, changing the temperature of the air entering the combustion system changes the speed of sound and therefore, the acoustic natural frequency of the combustor. Second, a change in compressor discharge temperature can be accompanied by, or result from, a change in airflow through the compressor, and therefore through the combustion system. Changing the airflow through the combustion system affects the coupling between the heat release fluctuation inherent to the combustion process and the acoustic resonant frequencies of the combustor. One specific mechanism known in the art to play a significant role in this coupling of heat release and combustor acoustic resonances occurs when acoustic pulsations driven by the heat release fluctuations cause mass flow fluctuations through the fuel ports, which then result in the fuel/air ratio of the flame zone to fluctuate. When the resulting fuel/air ratio fluctuation and the acoustic pressure pulsations are in-phase, a self-excited feedback loop results. This mechanism is a function of the time it takes for the fuel/air ratio disturbance to reach the flame zone, known in the art as convective time (Tau), and is therefore inversely proportional to the flow rate through the combustor. As the convective time increases, the frequency of the combustion instability decreases and when the convective time decreases, the frequency of the combustion instability increases. Therefore, by changing the compressor discharge temperature by changing the inlet guide vane, the flow of inlet bleed heat, and/or the temperature of the air entering the compressor, the natural acoustic frequency and/or the convective time of the combustor will change. By shifting the combustion dynamic frequency away from hot gas path component natural frequencies, operation of the gas turbine engine can continue without risk of damage to the turbine buckets due to high cycle fatigue.

Turning now to FIG. 1, which depicts a schematic view of an example embodiment of a gas turbine engine system 100 as may be used herein. For example, the gas turbine engine system 100 may include a compressor 102. The compressor 102 may compress an incoming flow of air 104. The compressor 102 may deliver the compressed flow of air 104 to a combustor 106. The combustor 106 may mix the compressed flow of air 104 with a pressurized flow of fuel 108 and ignite the mixture to create a flow of combustion gases 110. Although only a single combustor 106 is shown, the gas turbine engine system 100 may include any number of combustors 106. The flow of combustion gases 110 in turn may be delivered to a turbine 112. The turbine 112 may include a number of buckets 132 arranged in stages, such as stage 1, stage 2, stage 3, etc. The flow of combustion gases 110 may drive the buckets 132 within the turbine 112 so as to produce mechanical work. The mechanical work produced in the turbine 112 may drive the compressor 102 via a shaft 114 and an external load 116 such as an electrical generator or the like.

The gas turbine engine system 100 may use natural gas, various types of syngas, and/or other types of fuels. The gas turbine engine system 100 may have different configurations and may use other types of components. Moreover, other types of gas turbine engines also may be used herein. Multiple gas turbine engines, other types of turbines, and other types of power generation equipment also may be used herein together.

Still referring to FIG. 1, the gas turbine engine system 100 may include an inlet bleed heat system 120 associated with the compressor 102. The inlet bleed heat system 120 may be configured to remove hot air from an aft portion of the compressor 102 and to subsequently deliver the hot air back to the compressor 102 for recirculation therethrough. In certain embodiments, the inlet bleed heat system 120 may include a valve 124 or other control means for regulating the inlet bleed heat system 120. The amount of the inlet bleed heat may have an effect on the compressor discharge temperature and/or the flowrate of the air through the compressor.

In certain embodiments, the gas turbine engine system 100 may include an inlet guide vane system 118 associated with the compressor 102. The inlet guide vane system 118 may include a number of fixed and/or adjustable vanes therein. The angle of the inlet guide vanes may have an effect on the compressor discharge temperature and/or the flowrate of the air through the compressor.

In certain embodiments, the gas turbine engine system 100 may include one or more sensors positioned at various locations about the gas turbine engine system 100. The sensors may be associated with various components of the gas turbine engine system 100 for monitoring thereof. For example, a dynamic pressure sensor 128 may be associated with the combustor 106 for monitoring a combustion dynamic frequency and a combustion dynamic amplitude of the combustor 106. A temperature sensor 130 may be positioned downstream of the compressor 102 for monitoring a compressor discharge temperature and/or a combustor inlet temperature. An accelerometer, a strain gage, or an optical sensor 134 may be associated with the turbine 112, such as a stage 1 bucket 132, for monitoring the vibratory response of the bucket 132. Other sensors may also be used. The sensors may be of conventional design. Other types of operational parameters may be monitored herein. Moreover, any stage may be monitored in the turbine 112.

In certain embodiments, the gas turbine engine system 100 may include one or more controllers 122 in communication with the various components of the gas turbine engine system 100 for monitoring and/or controlling thereof. For example, the controller 122 may be in communication with, among other things, the compressor 102, the combustor 106, the turbine 112, the inlet guide vane system 118, the valve 124 of the inlet bleed heat system 120, the temperature sensor 130, the dynamic pressure sensor 128, and/or the vibration sensor 134, etc. The controller 122 may include at least a memory 125 and one or more processing units (or processors) 126. The processors 126 may be implemented as appropriate in hardware, software, firmware, or combinations thereof. Software or firmware implementations of the processors 126 may include computer-executable or machine-executable instructions written in any suitable programming language to perform the various functions described. Moreover, the processors 126 may be associated with a network, a server, a computer or a mobile device.

In some instances, the controller 122 may be configured to actively separate (or shift) a combustion dynamic frequency from a hot gas path component natural frequency by controlling a compressor discharge temperature. In some instances, the hot gas path component may be a stage one bucket 132; although any bucket stage may be used herein. For example, the controller 122 may be configured to determine, predict, monitor, identify, or the like a hot gas path component response amplitude and/or frequency, a combustion dynamic amplitude and/or frequency, and/or a compressor discharge temperature. The controller may also be configured to separate (or shift) the combustion dynamic frequency from the hot gas path component natural frequency by controlling/regulating the compressor discharge temperature. For example, the compressor discharge temperature may be controlled by adjusting the angle of the inlet guide vanes 118 associated with the compressor 102, by adjusting the inlet bleed heat system 120 associated with the compressor 102, by adjusting the temperature of the air entering the compressor, or a combination thereof. For example, the controller may open or close the valve 124 to increase or decrease the inlet bleed heat.

The algorithms associated with the controller 122 to separate (or shift) the combustion frequency can vary significantly, and will depend on the combustion architecture among other things. Although embodiments have been described in language specific to structural features and/or methodological acts, it is to be understood that the disclosure is not necessarily limited to the specific features or acts described. Rather, the specific features and acts are disclosed as illustrative forms of implementing the embodiments.

That which is claimed:

1. A method for frequency separation in a gas turbine engine having a compressor, a combustor having a convective time, and a turbine, the method comprising:
   determining a hot gas path component natural frequency, wherein the hot gas path component is located in the turbine;
   determining a combustion dynamic amplitude and/or frequency; and
   modifying a compressor discharge temperature with an adjustable flow of inlet bleed heat comprising hot air removed from an aft portion of the compressor that is supplied back to the compressor to separate the combustion dynamic frequency from the hot gas path component natural frequency and change the convective time of the combustor.

2. The method of claim 1, wherein determining the combustion dynamic amplitude and/or frequency comprises monitoring the combustor with at least one dynamic pressure sensor.

3. The method of claim 1, further comprising determining the compressor discharge temperature by monitoring the compressor with at least one temperature sensor.

4. The method of claim 1, wherein modifying the compressor discharge temperature comprises adjusting one or more inlet guide vanes.

5. The method of claim 1, wherein modifying the compressor discharge temperature comprises adjusting a temperature of air entering the compressor.

6. The method of claim 1, wherein modifying the compressor discharge temperature to separate the combustion dynamic frequency from the hot gas path component natural frequency results in a change to the combustor dynamic frequency.

7. A system for frequency separation in a gas turbine engine, the system comprising: a compressor; a combustor in communication with the compressor, wherein the combustor comprises a convective time; a turbine in communication with the compressor and the combustor, wherein the turbine comprises a hot gas path component; and a computer controller in communication with at least one of the compressor, the combustor, or the turbine, the computer controller being configured to modify a compressor discharge temperature with an adjustable flow of inlet bleed heat comprising hot air removed from an aft portion of the compressor that is supplied back to the compressor to separate a combustion dynamic frequency from a hot gas path component natural frequency and change the convective time of the combustor.

8. The system of claim 7, further comprising at least one dynamic pressure sensor associated with the combustor and configured to monitor the combustion dynamic frequency.

9. The system of claim 7, further comprising at least one temperature sensor associated with a compressor discharge and configured to monitor the compressor discharge temperature.

10. The system of claim 7, further comprising one or more inlet guide vanes associated with the compressor, wherein the computer controller is configured to adjust the one or more inlet guide vanes to modify the compressor discharge temperature.

11. The system of claim 7, wherein the computer controller is configured to adjust a temperature of air entering the compressor to modify the compressor discharge temperature.

12. The system of claim 7, wherein the hot gas path component natural frequency comprises a single frequency or a range of frequencies.

13. The system of claim 7, wherein the hot gas path component comprises a turbine bucket.

14. The system of claim 7, wherein the combustion dynamic frequency comprises a single frequency or a range of frequencies.

15. A system for frequency separation, comprising:
   a gas turbine engine comprising a compressor, a combustor in fluid communication with the compressor, wherein the combustor comprises a convective time, and a turbine in fluid communication with the combustor, wherein the turbine comprises a hot gas path component having a natural frequency; and
   a controller in communication with the gas turbine engine, the controller comprising:
      at least one memory that stores computer-executable instructions;
      at least one processor configured to access the at least one memory,
   wherein the at least one processor is configured to execute the computer-executable instructions to:
      determine the hot gas path component natural frequency;
      determine a combustion dynamic frequency; and
      modify a compressor discharge temperature with an adjustable flow of inlet bleed heat comprising hot air removed from an aft portion of the compressor that is supplied back to the compressor to separate the combustion dynamic frequency from the hot gas path component natural frequency and change the convective time of the combustor.

16. The system of claim 15, further comprising:
at least one dynamic pressure sensor associated with the combustor and configured to monitor the combustion dynamic frequency; and
at least one temperature sensor associated with the compressor and configured to monitor the compressor discharge temperature.

17. The system of claim 15, further comprising one or more inlet guide vanes associated with the compressor, wherein the controller is configured to adjust the one or more inlet guide vanes to modify the compressor discharge temperature.

18. The system of claim 15, wherein the controller is further configured to adjust a temperature of air entering the compressor to modify the compressor discharge temperature.

* * * * *